United States Patent
Beck et al.

(10) Patent No.: US 6,409,143 B1
(45) Date of Patent: Jun. 25, 2002

(54) DAMPER ASSEMBLY WITH AN ELECTRO-OPTICAL CONTROLLER FOR POSITIONING THE DAMPER VANES

(75) Inventors: George N. Beck, Lake Forest, CA (US); Stanislaus Plepis, Elizabeth, NJ (US)

(73) Assignee: EWC Controls Incorporated, Englishtown, NJ (US)

( * ) Notice: Subject to any disclaimer, the term of this patent is extended or adjusted under 35 U.S.C. 154(b) by 0 days.

(21) Appl. No.: 09/496,539

(22) Filed: Feb. 2, 2000

(51) Int. Cl.$^7$ ............................................. F16K 31/04
(52) U.S. Cl. ................... 251/129.04; 318/254; 318/640
(58) Field of Search ..................... 251/129.04; 318/640, 318/254

(56) References Cited

U.S. PATENT DOCUMENTS

| | | | |
|---|---|---|---|
| 3,610,567 A | * 10/1971 | Stuck ..................... 137/601.08 |
| 3,886,562 A | * 5/1975 | Atzinger et al. ......... 318/640 X |
| 3,924,605 A | * 12/1975 | Weinman et al. .... 137/487.5 X |
| 4,013,933 A | 3/1977 | Dohi et al. .................. 318/467 |
| RE30,204 E | * 2/1980 | Root ............................ 137/77 |
| 4,202,549 A | * 5/1980 | Takeuchi ................ 318/640 X |
| 4,224,515 A | * 9/1980 | Terrell ..................... 318/640 X |
| 4,410,949 A | 10/1983 | Hullinghorst et al. ....... 364/465 |
| 4,463,698 A | 8/1984 | Shinozaki et al. ............ 112/275 |
| 4,628,239 A | 12/1986 | Everett, Jr. .................. 318/685 |
| 4,706,006 A | * 11/1987 | Solomon .................... 318/640 |
| 4,835,449 A | 5/1989 | Huehn ........................ 318/282 |
| 4,843,292 A | * 6/1989 | Ono et al. .............. 318/640 X |
| 4,845,416 A | * 7/1989 | Scholl et al. ........ 251/129.04 X |
| 4,871,954 A | 10/1989 | Rathgeber ................... 318/466 |
| 4,902,945 A | * 2/1990 | Meades, Jr. et al. .... 251/129.04 X |
| 4,972,090 A | 11/1990 | Eaton .......................... 250/560 |
| 4,988,865 A | 1/1991 | Schmidt et al. ......... 250/231.16 |
| 5,003,239 A | 3/1991 | Matthews et al. ........... 318/600 |
| 5,109,675 A | * 5/1992 | Hwang .............. 251/129.04 X |
| 5,145,456 A | * 9/1992 | Ito et al. ............. 251/129.04 X |
| 5,279,556 A | 1/1994 | Goi et al. ...................... 604/67 |
| 5,534,691 A | 7/1996 | Holdaway et al. ...... 250/231.14 |
| 5,636,137 A | * 6/1997 | Hazelden ................ 318/640 X |
| 5,729,101 A | 3/1998 | Richmond et al. .......... 318/282 |
| 6,044,857 A | * 4/2000 | Stege ................ 251/129.04 X |
| 6,057,976 A | * 5/2000 | Ishida et al. ............ 318/640 X |

* cited by examiner

Primary Examiner—Henry C. Yuen
Assistant Examiner—John Bastianelli
(74) Attorney, Agent, or Firm—Lerner, David, Littenberg, Krumholz & Mentlik, LLP

(57) ABSTRACT

A damper assembly having adjustable damper vanes and a motor mechanically coupled for moving the damper vanes is operatively associated with an electro-optical controller for repositioning the damper vanes between a normally open and a closed position and vice versa. The electro-optical control has an opaque disk connected and movable with the damper vanes with a first bore corresponding to the open position, and a second bore corresponding to the closed position of the damper vanes. Each of the respective bores is operatively associated with a pair of coacting electronic elements consisting of a light emitting diode and a phototransistor. Each of the phototransistors communicates with an electronic system having logic circuitry so that when the light signals are detected by the phototransistor and signaled, the electronic system will actuate or stop the motor as programmed in the control logic circuitry to reposition the damper vanes.

6 Claims, 3 Drawing Sheets

DAMPER ASSEMBLY WITH AN ELECTRO-OPTICAL CONTROLLER FOR POSITIONING THE DAMPER VANES

This invention relates generally to devices for controlling the flow of air in heating, air-conditioning and ventilation systems, hereinafter air flow systems, and more particularly to a damper assembly having adjustably mounted damper vanes and an electro-optical controller for operating, positioning and repositioning the damper vanes to regulate, limit and inhibit flow of air in an air flow system.

BACKGROUND OF THE INVENTION

The use of airflow for transferring heat, moisture, scents, etc. in an air flow system is well known in the art.

One well-known mechanism for directing, controlling and regulating the quantity of air flowing through or being delivered through the ducts and vents in an air flow system is a damper assembly.

Such damper assemblies for regulating, limiting and inhibiting the airflow in such air flow systems include adjustably mounted damper vanes which may be adjusted manually or by a suitable motor coupled, mechanically, hydraulically or electrically or by combinations of such coupling means, to the damper vanes.

In mechanical/electrical controllers, the electrical switches wear and erode due to electrical arcing and therefore often fail in the normal course of operation and use of a given damper assembly.

Certain patents in the prior art show various types of electro-optical controllers for various applications.

Thus, U.S. Pat. No. 4,871,954 to Rathgeber discloses in column 1, lines 1–20, a motor control device for an air flap in a heating or air-conditioning unit. As shown in column 1, lines 11–17, the '954 patent discloses that it is known to provide such flaps within the framework of a servo system with a position indicator which reports the position of the flap back to the control device. The position indicator is disclosed by the '954 patent as being either contacting or non-contacting.

U.S. Pat. No. 4,988,865 to Schmidt et al. discloses a device for determining the angular position of the drive shaft in a sewing machine. As shown, for example, in FIG. 2, the '865 patent discloses a position signaling device having an opaque disk 3 mounted to the drive shaft. The disk is provided with a first set of slots 4 and a second set of slots 7 spaced circumferentially on the disk. Fixedly positioned and in alignment with each other on opposite sides of the disk are a plurality of light emitters 11 and light receivers 12 to control the device as the device is switched between two or more positions.

U.S. Pat. No. 4,628,239 to Everett, Jr. discloses a photo emitter/sensor assembly 36 and a slotted disk 34 having a plurality of equally spaced slots 40 for controlling the position of a carriage printer. The number of slots corresponds to the number of stop or stepping positions of the driving motor 30 and the shaft 32. A slot is provided in the disk for each stop or stepping position of the stepping motor.

U.S. Pat. No. 5,279,556 to Goi et al. discloses a drive shaft 13 coupled at one end to an electrically driven motor 21 and at the other end to a rotary disk 1. The rotary disk combined with first and second photoelectric detectors 2 and 3 constitute a rotary encoder 4 used to control a peristaltic pump. The rotary disk 1 is provided with a plurality of slits 5 defined along a circular row in a circumferentially equally spaced relationship with each other. The device is provided with a control unit 20 that is designed to execute a predetermined control program in response to the signals from photodetectors to apply a drive control signal.

U.S. Pat. No. 5,003,239 to Matthews et al. discloses a driving motor 42 connected to a drive shaft 46. An encoder wheel 60 is mounted on and rotates in conjunction with drive shaft 46. The encoder wheel is provided with a plurality of equispaced slits or sectors 62 on the outer circumference. Surrounding the outer circumference of the encoder wheel is a U-shaped housing 70. In the U-shaped housing is a pair of optical couplers 72,74. The first optical coupler 72 is oriented to correspond with the plurality of blocker segments 64 on the encoder wheel 60, thus acting to digitally read the blocker 64 and sector segments 62,66. The second optical coupler 74 is oriented radially offset from the radius of the plurality of sectors 62,66 to read a vane 68.

The '239 patent, as shown in column 5, lines 12–16, further states that the device can be coordinated with the use of stepping motors having different size steps.

The present invention provides an improved damper assembly having adjustably mounted damper vanes operatively associated with an electro-optical controller for operating, adjusting, positioning and repositioning the adjustably mounted damper vanes of a damper assembly in an air flow system from fully open to fully closed or approximately closed or at varying positions between fully open and fully closed, as the operating conditions in the air flow system may require to allow or inhibit the flow of air in the air flow system.

The present invention provides a damper assembly having adjustably mounted damper vanes for regulating, limiting and inhibiting airflow in an air flow system in which the damper vanes are connected to and positioned and repositioned by a suitable motor in turn actuated by an electro-optical controller. The electro-optical controller has an opaque disk fixedly connected and movable with the motor or the coupling connecting the motor to the damper vanes so that the opaque disk at all times reflects and coincides with the relative position of the damper vanes. The opaque disk is provided with a plurality of predetermined circumferentially sized and spaced openings or bores which correspond to the desired positioning and repositioning for the damper vanes. Operatively associated with the shaped and sized openings and bore are coacting pairs of light emitting diodes (LED's) and phototransistors disposed at fixed circumferentially spaced locations adjacent the front and rear surfaces of the opaque disk for directing signals to a control logic circuit and an associated electronic switch assembly for starting and terminating the motor for the positioning and repositioning of the damper vanes to provide the desired air flow conditions for the air flow system in which the damper assembly is mounted. The size of the holes in the opaque disk can be adjusted for approximately a 3°–5° circumferential movement to match the overshoot or stopping characteristics of the motor for adjusting the damper vanes. The respective location of the openings or bores in the opaque disk and the corresponding fixed locations of each coacting pair of LED's and phototransistors can also be adjusted to define the open and closed position of the damper vanes. Multiple additional openings or bores in the opaque disk between the bores defining the open and closed position of the damper vanes also associated multiple additional coacting pairs of the light emitting diodes and phototransistors can be provided to establish different open positions for the damper vanes of the damper assembly.

SUMMARY AND OBJECT OF THE INVENTION

Thus, in accordance with one aspect of the present invention, there is provided a damper assembly having adjustably mounted damper vanes for use in an air flow system having motor means connected to the damper vanes for moving the damper vanes between an open position and a closed position to regulate the volume of air flowing through the air flow system, movable means operatively associated with the motor means and the damper means including means thereon for identifying the relative position between open and closed of the damper vanes, an electronic system including logic circuitry for operating electronic switches to actuate the motor to move the damper vanes between the open and closed position, a light sensing means operatively associated with the identifying means on the movable means for signaling and transmitting responses to the logic circuitry on the relative position of the damper vanes between the open and closed positions to enable the control logic circuitry to actuate the motor means to position the damper means for the desired operation of the associated air flow system.

In accordance with another aspect of the present invention, there is provided an electro-optical control for operating and adjusting the adjustably mounted damper vanes in a damper assembly for an air flow system, from open to closed or approximately closed, as the air flow system may require, to allow and inhibit flow of air in the air flow system. This aspect of the present invention also includes a motor connected to the damper vanes for moving the damper vanes from open to closed position, an opaque disk rotatably mounted and movable on movement of the damper vanes having, at least two bores circumferentially spaced from each other, at least one of such bores corresponding to the open position of the damper vanes and another of the bores corresponding to the closed position of the damper vanes, an electronic assembly including logic circuitry and electronic switches for actuating the motor, and respective pairs of sensing and transmitting means fixedly mounted in predetermined spaced relation for operative association with the bore corresponding to the open position and the bore corresponding to the closed position of the damper vanes. The respective pairs of sensing and transmitting means are for signaling the position of said damper vanes to the electronic assembly to actuate the motor for positioning and repositioning the damper vanes in accordance with such signals.

Accordingly, it is an object of the present invention to provide a damper assembly having adjustably mounted damper vanes coupled to a motor for moving the damper vanes which also includes an electro-optical controller for actuating the motor which eliminates mechanical/electrical switches heretofore used for actuating such motors and replaces them with non-contacting coacting pairs of light sensing and detecting members for signaling electronic switches to operate the motor so as to eliminate the continuous wear and electrical arcing common to such mechanical/electrical switches.

It is another object of the present invention to eliminate the mechanical/electrical switches for operating the motor to adjust the relative position of the damper vanes in a damper assembly heretofore used in prior art devices and to replace them with non-contacting electronic switches and an electro-optical controller for actuating such motors so as to lengthen the functional operating life of the damper assembly.

DESCRIPTION OF A PREFERRED EMBODIMENT

Figure 1A:
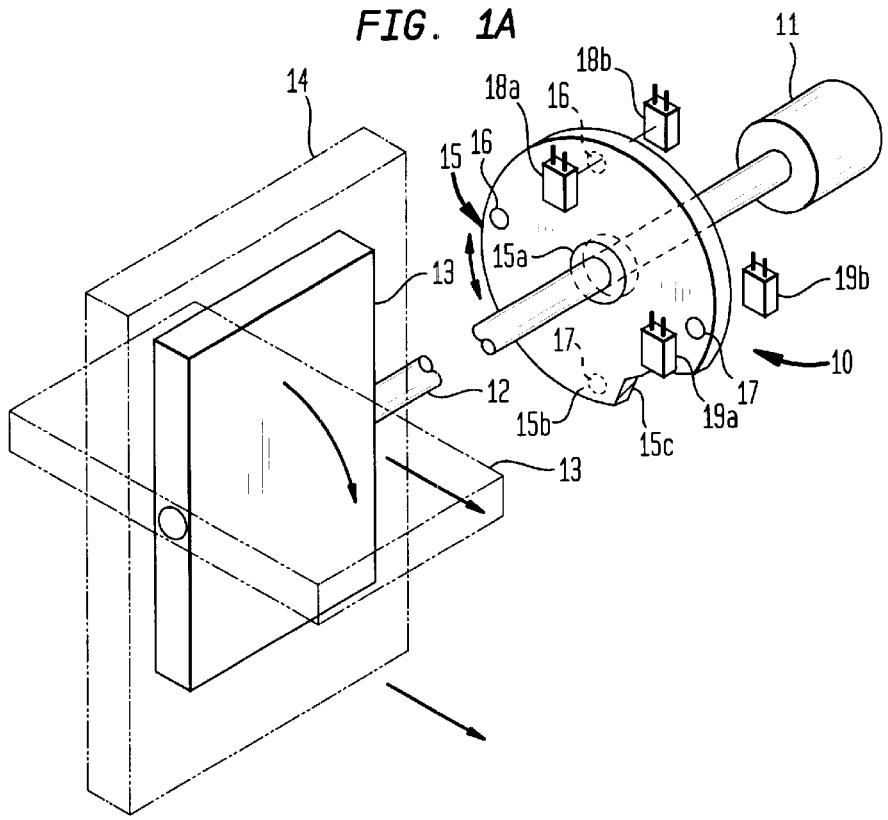
FIG. 1A is a schematic illustration of a damper assembly with adjustably mounted damper vanes coupled to a motor for adjusting the damper vane and showing the opaque disk with a first bore shown in solid lines and in dotted lines corresponding to movement of the damper vanes to the open position and a first coacting pair of light emitting diode and phototransistor for signaling and transmitting the relative position of the damper vanes to an operatively associated electro-optical controller and electronic switches all in accordance with the present invention for actuating the motor to reposition the adjustably mounted damper vanes in the damper assembly from the closed position shown in solid lines to the open position shown in dotted and dashed lines.
Figure 1B:
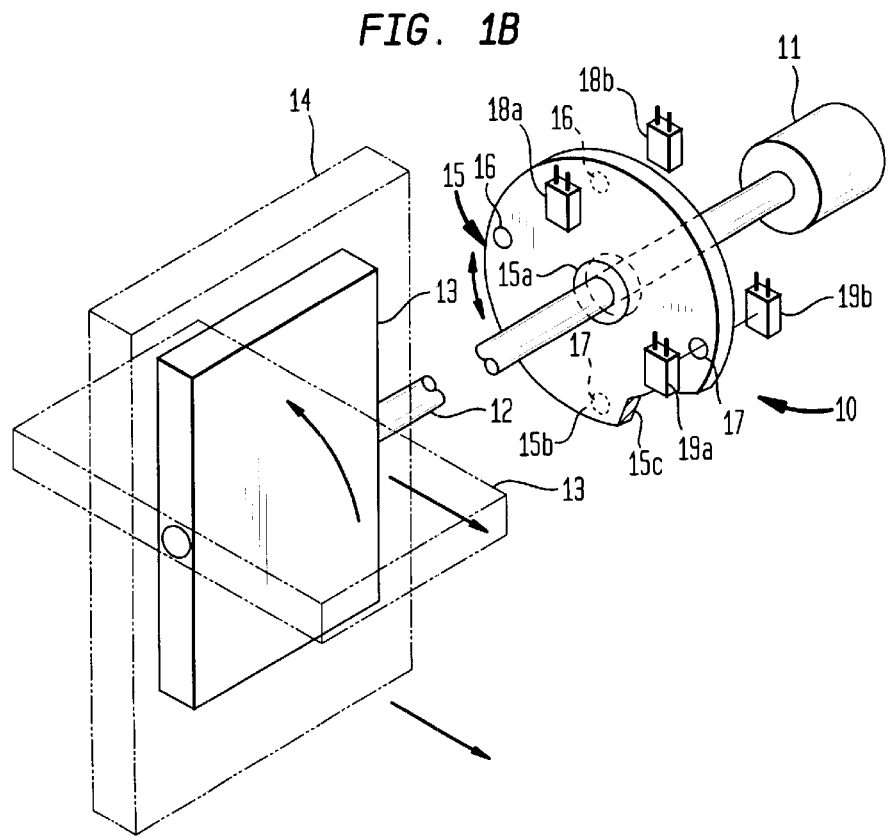
FIG. 1B is the same schematic illustration shown in FIG. 1A in which a second bore on the opaque disk is shown in solid lines and in dotted lines corresponding to the movement of the damper vanes to the closed position and a second coacting pair of light emitting diode and phototransistor for signaling and transmitting the relative position of the damper vanes to the operatively associated electro-optical controller and electronic switches in accordance with the present invention is shown for actuating the motor to reposition the adjustably mounted vanes in the damper assembly from the open position shown in dotted and dashed lines to the closed position shown in solid lines.

Referring to the drawings, FIGS. 1A and 1B are schematic drawings showing one preferred application of the electro-optical control system in accordance with the present invention generally designated 10 for operating a motor 11 connected through a coupling assembly generally designated 12 for positioning the adjustably mounted vanes 13 of a damper assembly 14 to allow or inhibit the flow of air as indicated by the arrows in the associated air flow system, not shown.

Damper assemblies adapted for controlling the flow of air in heating, ventilating and air-conditioning systems are purchasable on the open market such as the Damper Assembly Model No. SMD sold by EWC Controls Incorporated of Englishtown, N.J. Accordingly, this device will not be more fully described or illustrated because it will be understood by those skilled in the art.

One form of motor 11 for this purpose is a bi-directional electrical motor with integral reduction gearing operating at 24 volts or system voltage. Those skilled in the art will recognize that other motors may be used, such as a servo type motor or a stepping motor which moves in incremental arcuate steps. However, the motor selected may only be significant from a cost containment factor as long as it is capable and operable for rotating the coupling assembly 12 in arcuate steps from its normally open position, as shown in the dotted lines, to a closed or nearly closed position as shown by the solid lines and vice versa as may be required to control the quantity of air flowing in the particular air flow system in which the damper assembly is mounted.

Motors of the type described are well known in the art and easily purchasable on the open market. Hence the structure and operation of the motor 11 will only be described to the extent that it is operatively associated with the electro-optical control system in accordance with the present invention.

Electro-optical control system 10 directing commands to the motor 11 for operating the vanes 13 of the damper assembly 14 includes, an opaque disk 15 which is fixedly connected to and movable with the coupling assembly 12 as the coupling assembly is rotated by the motor 11 from the open position to the closed or approximately closed position and vice versa as the fluid flow system may require.

Opaque disk 15 is made of any suitable non-light transmitting plastic such as black phenolic, dark molded DELRIN™ and other well-known types of opaque plastic materials which are readily available on the open market. Opaque disk 15 has suitable fastening means as at 15a so it can be fixedly connected to the coupling assembly 12 and rotates therewith, as shown by the direction arrows and thus will always reflect the relative position of the vanes 13 of the damper assembly 14. Opaque disk 15 is provided with at least two spaced openings or bores as at 16 and 17, each respectively extending end to end through the opaque disk 15 from the front face 15b to the back or rear face 15c of the opaque disk 15, generally parallel to the axis of rotation of the coupling assembly 12, all of which is shown in FIGS. 1A, 1B, 2A and 2B of the drawings. The opening or bore 16 is disposed on the opaque disk 15 and moves to the point as shown by the dotted lines in these FIGURES of the drawings that corresponds with the normally and fully open position of the damper vanes 13 of the damper assembly 14. Spaced circumferentially from opening 16 is the opening or bore 17 which moves as shown by the dotted and solid lines in these FIGURES of the drawings corresponding to the closed or approximately closed position of damper vanes 13.

Those skilled in the art will recognize that it may not be desirable to fully close the vanes 13 of the damper assembly 14, more particularly in heating, ventilating and air-conditioning air flow systems where excessive back pressure may affect the blower for delivering the air under pressure in the system. In order to achieve this result, the opening or bore 17 is so positioned that when the selected motor 11 stops rotating the vanes 13, they will not fully close or seal the air flow duct or vent of the associated air flow system, not shown, in which the damper assembly 14 is mounted.

The electro-optical control system can operate with AC or DC motors and use either AC or DC voltages to power the electro-optical control system. Further, the motor selected for adjustably positioning the vanes of the damper assembly can operate in a single direction or both clockwise and counterclockwise as it rotates to position and reposition the vanes from the open position or positions to the closed position to allow or inhibit air flow in the air system and vice versa. Thus, the motor, its direction of rotation and the use of AC or DC voltages may be selected, without departing from the scope of the present invention.

Since the opaque disk 15 is fixedly connected to the coupling assembly 12 and is movable therewith, the opaque disk 15 and the spaced bores 16 and 17 reflect the relative open and closed positions of the damper vanes 13 of the damper vane assembly 14. In order to detect and to sense the position of the vanes 13 as identified by the position of the opaque disk 15 and the spaced bores 16 and 17, the electro-optical control system 10 is provided with a circumferentially fixed and spaced first light emitting diode (LED) 18a and second light emitting diode (LED) 19a mounted by any suitable means, not shown, adjacent to the front face 15b of the opaque disk 15. The LED's 18a and 19a will preferably have circumferential spacing at 90° from each other and the circumferential spacing for the openings or bores 16 and 17 in the opaque disk 15 will be at 180° from each other for reasons that will be clear from the operation of the present invention as hereinafter set forth, all of which is shown in FIGS. 1A, 1B, 2A and 2B of the drawings. A light emitting diode (LED) is an electronic component which emits a steady relatively narrow beam of light when current passes through it at the time the electronic system in which it is a component is in operation. LED's are electronic components which are well known in the electronic art.

Disposed to coact with the LED's 18a and 19a are a corresponding number of circumferentially spaced phototransistors 18b and 19b. The phototransistors 18b and 19b are fixedly mounted by any suitable means, also not shown, adjacent the back or rear face 15c of the opaque disk 15 in alignment with the respective associated LED's 18a and 19a. When either of the phototransistors 18b and 19b sense the beam of light issuing from their associated respective coacting LED's 18a or 19a through openings or bores 16 and 17, they convert the beam of light into an electrical signal which is transmitted and used as a signal by the associated elements of the electro-optical control 10, as is hereinafter described. Phototransistors are also well known in the electronic art and easily purchasable on the open market.

Figure 3:
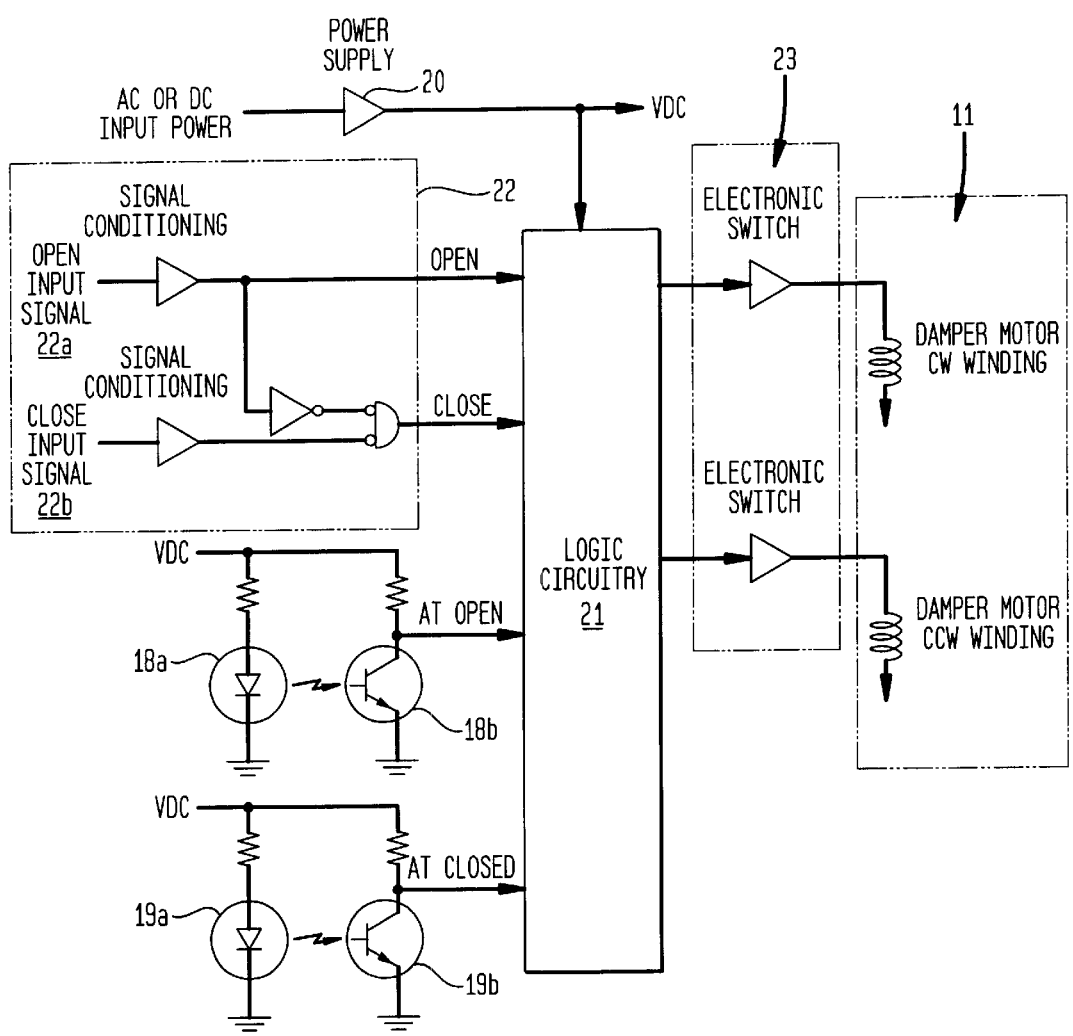
FIG. 3 is a block diagram of the electronic circuit including the electronic switches of the electro-optical control system for actuating the motor in accordance with the signals transmitted from the coacting pairs of light emitting diodes and phototransistors of the electro-optical control system for the damper assembly shown in FIGS. 1A, 1B, 2A and 2B.

FIG. 3 shows that the electro-optical control 10 is provided with a power supply 20 which converts AC input voltage or DC input voltage to a level suitable to power the control logic circuitry 21 and provide the DC operating voltage for the respective LED's 18a and 19a and the phototransistors 18b and 19b. Control logic circuitry 21 may be either transistor logic or integrated circuit logic. It receives instructions for adjusting the damper assembly 14 in the associated air flow system from an input signal assembly 22 and operates by monitoring the input signals received, if any, from the phototransistors 18b and 19b showing the position of the damper vanes 13. The input signals or no signals from the phototransistors 18b and 19b are used by the control logic circuitry 21 to position and reposition the damper vanes from open to closed or approximately closed and vice versa by generating a signal to an electronic switch assembly 23 for starting and stopping the motor rotating the vanes 13 to position the vanes 13 in accordance with the combined signal from the input signal assembly 22 and the signal, if any, from the phototransistors 18b and 19b to the control logic circuitry 21.

The lack of any input signals from the phototransistors 18b and 19b, that is, when the phototransistors are off, also serves to show the existing condition of the damper vanes 13. If no signal is received from either of the phototransistors 18b or 19b, the control logic circuitry 21 will signal the electronic switch assembly 23 in accordance with the signals from the input signal assembly 22 to start and stop the motor 11 to move the damper vanes either to an open position or a closed position and vice versa, at which time actuation of the motor will terminate.

Operation of Electro-Optical Control

The operation of the electro-optical control 10 with the damper assembly 14 in accordance with the present invention, by way of illustration, for operation of a bi-directional motor 11 which depends on the interaction of the signals from the input signal assembly 22 and the signals, if any, transmitted from the phototransistors 18b and 19b. Thus, by reference to FIG. 1A showing movement of the damper vane from the closed to open position and FIG. 3 of the drawings, when voltage from the power supply 20 is applied to the open input terminal 22a of the input signal assembly 22 for moving the damper vanes 13 to the open position, the control logic circuitry switches LED 18a on and signals the electronic switch assembly 23 to activate motor 11. Motor 11 starts rotating counter-clockwise and continues to rotate until the bore 16, coinciding with the open position of the damper vanes 13, as shown by the dotted lines for bore 16 in FIG. 1A, passes in front of the LED 18a, and light from the LED is detected and sensed by the phototransistor 18b. The phototransistor signals the condition of the damper vanes 13 to the control logic circuit 21. Control logic circuitry in turn transmits a control signal to and thus commands the electronic switch assembly 23 to terminate operation of the motor 11 and the motor stops. Bore 16 will be sized large enough to allow motor 11 to overshoot the open position of the damper vanes 13 in a range from 2° to 5° of rotational movement and still keep the phototransistor 18b sensing the light from the LED 18a and transmitting the necessary signals to the control logic circuitry to enable the electronic switch assembly 23 to terminate rotation of motor 11 and keep the damper vanes 13 in their normally open position.

By reference to FIGS. 1B and 3 of the drawings, when voltage from the power supply is applied to closed input terminal 22b of the input signal assembly for moving the damper vane 13 from the open position to the closed position, the control logic circuitry switches LED 19a on and sends a signal or commands the electronic switch assembly 23 to start motor 11 again. Motor 11 now starts rotating clockwise and continues to rotate. When the phototransistor 19b senses light from the LED 19a through the bore 17, as shown by the solid lines for bore 17 at FIG. 1B, corresponding to the closed position of the damper vanes 13, it begins conducting and signals the condition of the damper vanes 13 to the control logic circuitry. The control logic circuitry 21 now in turn commands the electronic switch assembly 23 to terminate the operation of the motor 11 and motor 11 stops. Opening or bore 17, as in the case of bore 16, is again sized to permit the motor 11 to overshoot the closed position of the damper vanes 13 in a range from 2° to 5° of rotational movement so as to permit the phototransistor 19b to continue transmitting the necessary signals to the control logic circuitry to enable the electronic switch assembly 23 to terminate rotation of the motor 11 and keep the damper vanes in the closed position.

This operation can be repeated for repositioning the damper vanes 13 as voltage from the power supply 20 is applied to or removed respectively from the open and/or closed input terminals 22a and 22b and the respective associated LED 18a or LED 19A are turned on and off to obtain the desired operation to allow or to inhibit flow of air through the damper assembly in the associated air flow system.

Figure 2A:
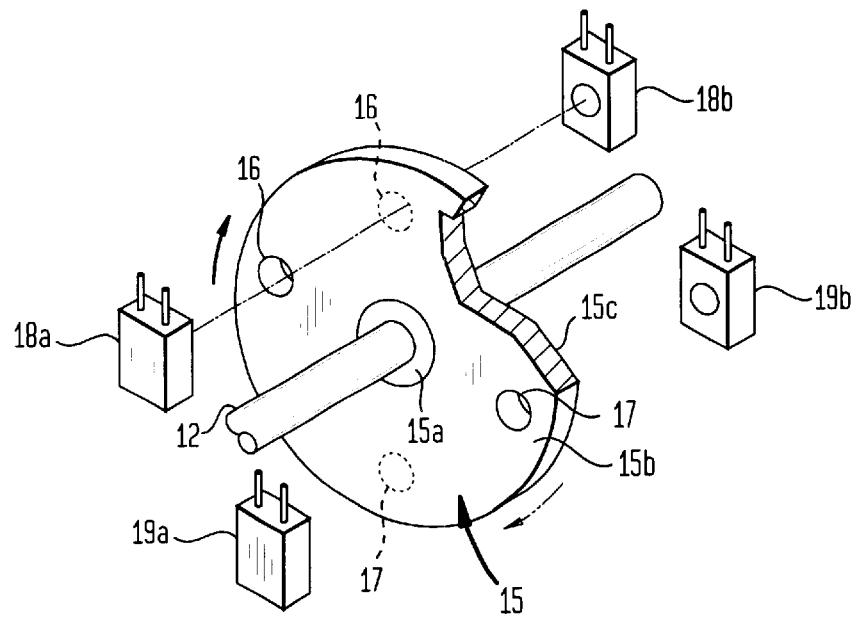
FIG. 2A is an enlarged view partly in cross-section of the operatively interrelated opaque disk, the first coacting pair of light emitting diode and the phototransistor of the optical section of the electro-optical control system for transmitting signals to the electronic circuit for operating the motor to reposition the damper vanes in the damper assembly, as shown in FIG. 1A from the closed position to the open position with the relative movement of the first bore shown in solid lines for the closed position and dotted lines for the open position of the damper vanes.
Figure 2B:
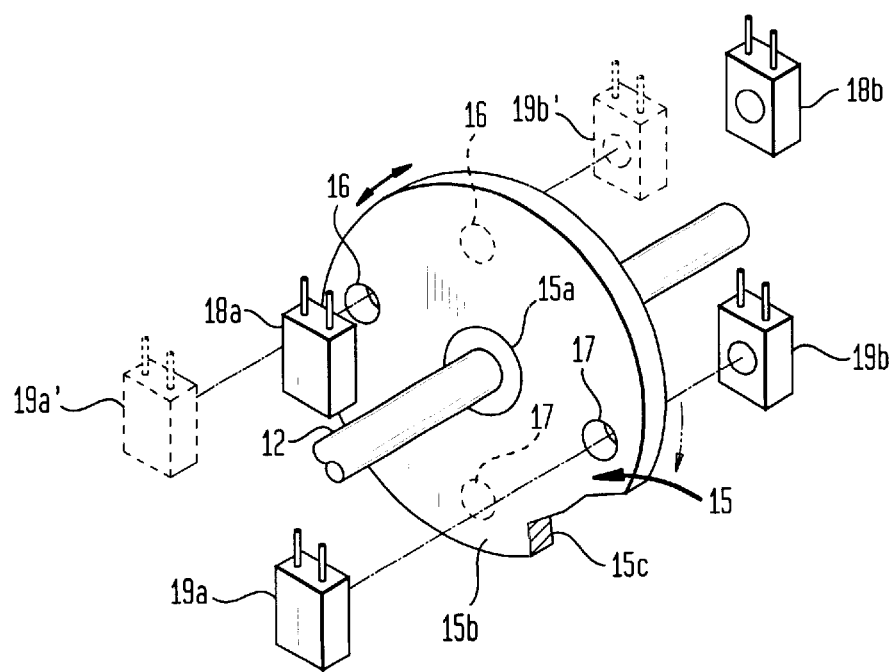
FIG. 2B is an enlarged view partly in cross-section of the operatively interrelated opaque disk, the second coacting pair of light emitting diode and the phototransistor of the optical section of the electro-optical control system for transmitting signals to the electronic circuit for operating the motor to reposition the damper vanes in the damper assembly, as shown in FIG. 1B from the open to the closed position with the relative movement of the bores shown in dotted lines for the open position and solid lines for the closed position of the damper vanes for a bi-directional motor and in phantomized lines showing the position of the second coating pair of light emitting diode and phototransistor of the optical section for a motor operating in a single direction.

The operation of the electro-optical control 10 for a damper assembly 14 having a two-input motor rotating in a single direction can also be illustrated by reference to FIG. 2B showing the phantomized circumferential repositioning of the second light emitting diode LED as at 19a' and second phototransistor as at 19b'. Thus, when voltage from the power supply 20 is applied to the open input terminal 22a of the input signal assembly 22, to move the damper vanes 13 of the damper assembly 14 to the open position, the control logic circuitry 21 switches LED 18a on and commands the electronic switch assembly 23 to actuate the motor 11. Motor 11 starts rotating and continues to rotate. When bore 16 corresponding to the open position of the damper vanes 13 passes in front of LED 18a, phototransistor 18b detects and senses the light being emitted by LED 18a and signals the position of the damper vanes 13 to the control logic circuitry 21. Control logic circuitry 21 commands the electronic switch assembly 23 to terminate operation of the motor 11, and motor 11 stops rotating. Since bore 16 is oversized, as in the earlier illustration, the motor can overshoot the open position of the damper vanes 13 without prematurely terminating operation of the phototransistor 18b and the signals being transmitted to the control logic circuitry 21, thus insuring that the damper vanes 13 are moved to the fully open position.

When voltage from the power supply 20 is applied to the closed input terminal 22b of the input signal assembly 22, the control logic circuitry 21 switches LED 19a' on and commands the electronic switch assembly 23 to activate the motor 11 to move the damper vanes 13 from the normally open position to the closed position. Motor 11 starts rotating in the same direction and continues to rotate. When bore 17 corresponding to the closed or approximately closed position of the damper vanes 13 passes in front of LED 19a', the light emitted from LED 19a' is detected and sensed by phototransistor 19b', and phototransistor 19b' begins conducting and signaling the condition of the damper vanes 13 to the control logic circuitry 21. Control logic circuitry 21 sends a control signal or commands the electronic switch assembly 23 to terminate operation of the motor 11, and motor 11 stops. As in the earlier instances, the bore 17 will be oversized to permit the motor 11 to overshoot the closed or approximately closed position of the damper vanes 13 without terminating operation of phototransistor 19b, for the same object and purposes as above set forth.

This operation for a damper assembly with a two-input single direction motor can be repeated for positioning and repositioning the damper vanes 13 as voltage from the power supply 20 is applied to or removed from the open input terminal 22a or closed input terminal 22b of the input signal assembly 22 to obtain the desired operation either to allow or the inhibit flow of air through the damper assembly in the associated air flow system.

As a still further illustration, operation of the electro-optical control 10 for the damper assembly 14 having a two-input bi-directional motor; namely, a motor that rotates in one direction for opening the damper vanes and in the opposite direction for closing the damper vanes; will also be described. Thus, when voltage from the power supply 20 is applied to the open input terminal 22a on the input signal assembly 22, to move the damper vanes 13 of the damper assembly 14 to the normally open position, the control logic circuitry 21 switches LED 18a on and commands the electronic switch assembly 23 to actuate the motor 11. Motor 11 starts rotating in the counterclockwise direction to cause the damper vanes 13 to move to the open position and continues to rotate. When bore 16 corresponding to the open position of the damper vanes 13 passes in front of LED 18a, phototransistor 18b detects and senses the light being emitted by LED 18a and signals the position of the damper vanes 13 to the control logic circuitry 21. Control logic circuitry 21 commands the electronic switch assembly to terminate operation of the motor 11, and motor 11 stops rotating. Since bore 16 is oversized, as in the earlier illustration, the motor can overshoot the open position of the damper vanes 13 without prematurely terminating operation of the phototransistor 18b and the signals transmitted to the control logic circuitry 21, thus insuring that the damper vanes 13 are moved to the fully open position.

Further, when the voltage from the power supply 20 is applied to the closed input terminal 22b of the input signal assembly 22, the control logic circuitry detects this, switches LED 19a on and commands the electronic switch assembly 23 to activate the motor 11 to rotate in the clockwise direction to close the damper vanes 13. Accordingly, motor 11 starts to rotate in the closing direction for the damper vanes 13 and continues to rotate. When bore 17 corresponding to the closed position of the damper vanes 13 passes in front of LED 19a, the light transmitted through the opaque disk 15 is detected and sensed by phototransistors 19b and transmitted to the control logic circuitry 21. Control logic circuitry 21 commands the electronic switch assembly 23 to terminate operation of the motor 11, and motor 11 stops. The size of bore 17 allows the motor to overshoot the closed or approximately closed position of the damper vanes for the same purposes and objects as above set forth.

This operation for a damper assembly with a two-input bi-directional motor can be repeated for positioning and repositioning the damper vanes 13 as voltage from the power supply 20 is applied to or removed from the open input terminal 22a or closed input terminal 22b of the input signal assembly 22 to obtain the desired operation to allow or to inhibit flow of air through the damper assembly in the associated air flow system.

Since the electro-optical system as above described utilizes electronic components, the problems of the earlier prior art mechanical-electrical switches are eliminated, the control system operates much more quietly, does not generate electromotive induction conditions which can interfere with microcontroller-based temperature and zone controls used in such air flow systems and can be easily modified to produce varying beneficial results as may be needed to customize a given air flow system.

While this invention has been described in terms of its preferred use, namely, controlling the flow of air in an air flow system, those skilled in the use of damper assemblies for this purpose will readily recognize that the present application is also applicable to fluid flow systems of all types where a device in such fluid flow systems can be operated by an electro-optical system in accordance with the present invention to allow or inhibit the flow of the fluid in any such fluid flow system.

It will be understood that the invention is not to be limited to the specific construction or arrangement of parts shown but that they may be widely modified within the invention defined by the following claims.

What is claimed is:

1. The combination with a damper assembly having, adjustably mounted damper vanes, a motor for positioning and repositioning the damper vanes between an open position and a closed position and vice versa for controlling the volume of air flowing in an associated air flow system of an electro-optical controller comprising:

a. opaque means at all times fixedly connected and movable with the damper vanes to reflect the position of the damper vanes;

b. first means on the opaque means corresponding to the open position of the damper vanes and second means on the opaque means corresponding to the closed position of the damper vanes;

c. a first pair of coacting electronic elements including, a first light transmitting member and a first light sensing and signaling member fixedly mounted and in alignment with each other, for operative action with the first means corresponding to the open position of the damper vanes;

d. a second pair of coacting electronic elements including, a second light transmitting member and a second light sensing and signaling member fixedly mounted and in alignment with each other for operative action with the second means corresponding to the closed position of the damper vanes;

e. an electronic circuit including, an input signaling assembly for directing the electronic circuit to move the damper vanes between the open and closed position and vice versa, and an electronic switch assembly for starting and stopping the motor in accordance with the signals of the electronic circuit; and f. said first sensing and signaling member connected to the electronic circuit to signal when the damper vanes are in the open position and said second sensing and signaling member connected to the electronic circuit to signal when the damper vanes are in the closed position to enable the electronic circuit to direct the electronic switch assembly to start and stop the motor in accordance with the signals received from the input signal assembly by the electronic circuit, for positioning and repositioning the damper vanes.

2. In the combination as in claim 1 wherein the opaque means is a rotatably mounted opaque disk, said first means corresponding to the open position of the damper vanes is a first bore extending end to end through said opaque means and the second means corresponding to the closed position of the damper vanes is a second bore extending end to end through said opaque means.

3. In the combination as in claim 2 wherein the opaque means has a front surface and a rear surface, said first pair of coacting electronic elements and said second pair of coacting electronic elements having their respective light transmitting members disposed in predetermined circumferentially spaced relation and fixedly mounted adjacent the front face of the opaque means to direct light towards the front surface of said opaque means, and their respective first and second light sensing and signaling members also disposed in circumferentially spaced relation and fixedly mounted adjacent the rear face of the opaque means and in alignment with the associated light transmitting member of the coacting pair so as to sense light from the associated light transmitting member when the first means corresponding to the open position and the second means corresponding to the closed position passes in front of at least one coacting light transmitting member of the respective first and second pair of coacting electronic elements.

4. In the combination as in claim 2 or 3 wherein the first means corresponding to the open position and the second means corresponding to the closed position are sized as a function of the motor for positioning and repositioning the damper vanes to permit the motor to overshoot when stopping the movement of the damper vanes.

5. The combination with a damper assembly having adjustably mounted damper vanes, a motor for positioning and repositioning the damper vanes between an open position and a closed position and vice versa for controlling the volume of air flowing in an associated air flow system of an electro-optical controller comprising:

a. opaque disk means at all times fixedly connected and movable with the damper vanes to reflect the position of the damper vanes, said opaque disk means having a front surface and a rear surface;

b. a first bore extending end-to-end through said opaque disk means corresponding to the open position of the damper vanes and a second bore also extending end-to-end through said opaque disk means corresponding to the closed position of the damper vanes and disposed at a predetermined spaced circumferential position from said first bore;

c. a first pair of coacting electronic elements including, a first light-transmitting member fixedly mounted adjacent the front face of the opaque disk means and a first light-sensing and signaling member fixedly mounted adjacent the rear face of the opaque disk means and in alignment with the first light-transmitting member to enable the first coacting electronic elements to be disposed for operative action with the first bore corresponding to the open position of the damper vanes;

d. a second pair of coacting electronic elements including, a second light-transmitting member fixedly mounted adjacent the front face of the opaque disk means and a second light-sensing and signaling member fixedly mounted adjacent the rear face of the opaque disk means and in alignment with the second light-transmitting member to enable the second coacting electronic elements to be disposed for operative action with the second bore corresponding to the closed position of the damper vanes;

e. said first pair of coacting electronic elements and said second pair of electronic elements having their respective first light-transmitting member and second light-transmitting member in predetermined circumferential spaced relation to enable their associated first light-sensing and signaling members and second light-sensing and signaling members to sense light from the associated light-transmitting member when the first bore corresponding to the open position of the damper vanes and the second bore corresponding to the closed position passes in front of light transmitted from the first light-transmitting means and the second light-transmitting means of the first and second pair of coacting electronic elements;

f. an electronic circuit including, an input signaling assembly for the electronic directing the electronic circuit to move the damper vanes between the open and closed position and vice versa, and an electronic switch assembly for starting and stopping the motor in accordance with the signals of the electronic circuit;

g. said first sensing and signaling member connected to the electronic circuit to signal when the damper vanes are in the open position and said second sensing and signaling member connected to the electronic circuit to signal when the damper vanes are in the closed position to enable the electronic circuit to direct the electronic switch assembly to start and stop the motor in accordance with the signals received from the input signal assembly of the electronic circuit, for positioning and repositioning the damper vanes; and h. the first bore corresponding to the open position and the second bore corresponding to the closed position are sized as a function of the motor for positioning and repositioning the damper vanes to provide 2° to 5° of additional rotation of the motor to permit the motor to overshoot when stopping the repositioning of the damper vanes.

6. In the combination as in claim 2 or 3 wherein the second means is so spaced as to permit limited flow when the damper vanes are moved to the closed position.

* * * * *

UNITED STATES PATENT AND TRADEMARK OFFICE
CERTIFICATE OF CORRECTION

PATENT NO.    : 6,409,143 B1
DATED         : June 25, 2002
INVENTOR(S)   : Beck et al.

It is certified that error appears in the above-identified patent and that said Letters Patent is hereby corrected as shown below:

Delete columns 1 thru 12, and substitute the attached columns 1 thru 12.

Signed and Sealed this

Twenty-eighth Day of October, 2003

JAMES E. ROGAN
*Director of the United States Patent and Trademark Office*

DAMPER ASSEMBLY WITH AN ELECTRO-OPTICAL CONTROLLER FOR POSITIONING THE DAMPER VANES

BACKGROUND OF THE INVENTION

This invention relates generally to devices for controlling the flow of air in heating, air-conditioning and ventilation systems, hereinafter air flow systems, and more particularly to a damper assembly having adjustably mounted damper vanes and an electro-optical controller for operating, positioning and repositioning the damper vanes to regulate, limit and inhibit flow of air in an air flow system.

The use of airflow for transferring heat, moisture, scents, etc. in an air flow system is well known in the art.

One well-known mechanism for directing, controlling and regulating the quantity of air flowing through or being delivered through the ducts and vents in an air flow system is a damper assembly.

Such damper assemblies for regulating, limiting and inhibiting the airflow in such air flow systems include adjustably mounted damper vanes which may be adjusted manually or by a suitable motor coupled, mechanically, hydraulically or electrically or by combinations of such coupling means, to the damper vanes.

In mechanical/electrical controllers, the electrical switches wear and erode due to electrical arcing and therefore often fail in the normal course of operation and use of a given damper assembly.

Certain patents in the prior art show various types of electro-optical controllers for various applications.

Thus, U.S. Pat. No. 4,871,954 to Rathgeber discloses in column 1, lines 1–20, a motor control device for an air flap in a heating or air-conditioning unit. As shown in column 1, lines 11–17, the '954 patent discloses that it is known to provide such flaps within the framework of a servo system with a position indicator which reports the position of the flap back to the control device. The position indicator is disclosed by the '954 patent as being either contacting or non-contacting.

U.S. Pat. No. 4,988,865 to Schmidt et al. discloses a device for determining the angular position of the drive shaft in a sewing machine. As shown, for example, in FIG. 2, the '865 patent discloses a position signaling device having an opaque disk 3 mounted to the drive shaft. The disk is provided with a first set of slots 4 and a second set of slots 7 spaced circumferentially on the disk. Fixedly positioned and in alignment with each other on opposite sides of the disk are a plurality of light emitters 11 and light receivers 12 to control the device as the device is switched between two or more positions.

U.S. Pat. No. 4,628,239 to Everett, Jr. discloses a photo emitter/sensor assembly 36 and a slotted disk 34 having a plurality of equally spaced slots 40 for controlling the position of a carriage printer. The number of slots corresponds to the number of stop or stepping positions of the driving motor 30 and the shaft 32. A slot is provided in the disk for each stop or stepping position of the stepping motor.

U.S. Pat. No. 5,279,556 to Goi et al. discloses a drive shaft 13 coupled at one end to an electrically driven motor 21 and at the other end to a rotary disk 1. The rotary disk combined with first and second photoelectric detectors 2 and 3 constitute a rotary encoder 4 used to control a peristaltic pump. The rotary disk 1 is provided with a plurality of slits 5 defined along a circular row in a circumferentially equally spaced relationship with each other. The device is provided with a control unit 20 that is designed to execute a predetermined control program in response to the signals from photodetectors to apply a drive control signal.

U.S. Pat. No. 5,003,239 to Matthews et al. discloses a driving motor 42 connected to a drive shaft 46. An encoder wheel 60 is mounted on and rotates in conjunction with drive shaft 46. The encoder wheel is provided with a plurality of equispaced slits or sectors 62 on the outer circumference. Surrounding the outer circumference of the encoder wheel is a U-shaped housing 70. In the U-shaped housing is a pair of optical couplers 72,74. The first optical coupler 72 is oriented to correspond with the plurality of blocker segments 64 on the encoder wheel 60, thus acting to digitally read the blocker 64 and sector segments 62,66. The second optical coupler 74 is oriented radially offset from the radius of the plurality of sectors 62,66 to read a vane 68.

This last mentioned '239 patent, as shown in column 5, lines 12–16, further states that the device can be coordinated with the use of stepping motors having different size steps.

The present invention provides an improved damper assembly having adjustably mounted damper vanes operatively associated with an electro-optical controller for operating, adjusting, positioning and repositioning the adjustably mounted damper vanes of a damper assembly in an air flow system from fully open to fully closed or approximately closed or at varying positions between fully open and fully closed, as the operating conditions in the air flow system may require to allow or inhibit the flow of air in the air flow system.

The present invention provides a damper assembly having adjustably mounted damper vanes for regulating, limiting and inhibiting airflow in an air flow system in which the damper vanes are connected to and positioned and repositioned by a suitable motor in turn actuated by an electro-optical controller. The electro-optical controller has an opaque disk fixedly connected and movable with the motor or the coupling connecting the motor to the damper vanes so that the opaque disk at all times reflects and coincides with the relative position of the damper vanes. The opaque disk is provided with a plurality of predetermined circumferentially sized and spaced openings or bores which correspond to the desired positioning and repositioning for the damper vanes. Operatively associated with the shaped and sized openings and bore are coacting pairs of light emitting diodes (LED's) and phototransistors disposed at fixed circumferentially spaced locations adjacent the front and rear surfaces of the opaque disk for directing signals to a control logic circuit and an associated electronic switch assembly for starting and stopping the motor for the positioning and repositioning of the damper vanes to provide the desired air flow conditions for the air flow system in which the damper assembly is mounted. The size of the holes in the opaque disk can be adjusted for approximately a 3°–5° circumferential movement to match the overshoot or stopping characteristics of the motor for adjusting the damper vanes. The respective location of the openings or bores in the opaque disk and the corresponding fixed locations of each coacting pair of LED's and phototransistors can also be adjusted to define the open and closed position of the damper vanes. Multiple additional openings or bores in the opaque disk between the bores defining the open and closed position of the damper vanes also associated multiple additional coacting pairs of the light emitting diodes and phototransistors can be provided to establish different open positions for the damper vanes of the damper assembly.

SUMMARY OF THE INVENTION

Thus, in accordance with one aspect of the present invention, there is provided a damper assembly having adjustably mounted damper vanes for use in an air flow system having motor means connected to the damper vanes for moving the damper vanes between an open position and a closed position to regulate the volume of air flowing through the air flow system, movable means operatively associated with the motor means and the damper means including means thereon for identifying the relative position between open and closed of the damper vanes, an electronic system including logic circuitry for operating electronic switches to actuate the motor to move the damper vanes between the open and closed position, a light sensing means operatively associated with the identifying means on the movable means for signaling and transmitting responses to the logic circuitry on the relative position of the damper vanes between the open and closed positions to enable the control logic circuitry to actuate the motor means to position the damper means for the desired operation of the associated air flow system.

In accordance with another aspect of the present invention, there is provided an electro-optical control for operating and adjusting the adjustably mounted damper vanes in a damper assembly for an air flow system, from open to closed or approximately closed, as the air flow system may require, to allow and inhibit flow of air in the air flow system. This aspect of the present invention also includes a motor connected to the damper vanes for moving the damper vanes from open to closed position, an opaque disk rotatably mounted and movable on movement of the damper vanes having, at least two bores circumferentially spaced from each other, at least one of such bores corresponding to the open position of the damper vanes and another of the bores corresponding to the closed position of the damper vanes, an electronic assembly including logic circuitry and electronic switches for actuating the motor, and respective pairs of sensing and transmitting means fixedly mounted in predetermined spaced relation for operative association with the bore corresponding to the open position and the bore corresponding to the closed position of the damper vanes. The respective pairs of sensing and transmitting means are for signaling the position of said damper vanes to the electronic assembly to actuate the motor for positioning and repositioning the damper vanes in accordance with such signals.

Accordingly, it is an object of the present invention to provide a damper assembly having adjustably mounted damper vanes coupled to a motor for moving the damper vanes which also includes an electro-optical controller for actuating the motor which eliminates mechanical/electrical switches heretofore used for actuating such motors and replaces them with non-contacting coacting pairs of light sensing and detecting members for signaling electronic switches to operate the motor so as to eliminate the continuous wear and electrical arcing common to such mechanical/electrical switches.

It is another object of the present invention to eliminate the mechanical/electrical switches for operating the motor to adjust the relative position of the damper vanes in a damper assembly heretofore used in prior art devices and to replace them with non-contacting electronic switches and an electro-optical controller for actuating such motors so as to lengthen the functional operating life of the damper assembly.

BRIEF DESCRIPTION OF THE DRAWINGS

FIG. 1A is a schematic illustration of a damper assembly with adjustably mounted damper vanes coupled to a motor for adjusting the damper vane and showing the opaque disk with a first bore shown in solid lines and in dotted lines corresponding to movement of the damper vanes to the open position and a first coacting pair of light emitting diode and phototransistor for signaling and transmitting the relative position of the damper vanes to an operatively associated electro-optical controller and electronic switches all in accordance with the present invention for actuating the motor to reposition the adjustably mounted damper vanes in the damper assembly from the closed position shown in solid lines to the open position shown in dotted and dashed lines, FIG. 1B is the same schematic illustration shown in FIG. 1A in which a second bore on the opaque disk is shown in solid lines and in dotted lines 180° from the first bore and corresponding to the movement of the damper vanes to the open position and a second coacting pair of light emitting diode and phototransistor and 90° from the first coacting pair for signaling and transmitting the relative position of the damper vanes to the operatively associated electro-optical controller and electronic switches in accordance with the present invention for actuating the motor to reposition the adjustably mounted vanes in the damper assembly from the open position shown in dotted and dashed lines in FIGS. 1 and 2 to the closed position shown by solid lines in FIGS. 1 and 2, FIG. 2A is an enlarged view partly in cross-section. of the operatively interrelated opaque disk, the first coacting pair and second coacting pair of light emitting diode and the phototransistor of the optical section of the electro-optical control system for transmitting signals to the electronic circuit for operating the motor to reposition the damper vanes in the damper assembly, as shown in FIG. 1A from the closed position to the open position with the relative movement of the first bore shown in solid lines for the closed position and dotted lines for the open position of the damper vanes, FIG. 2B is an enlarged view partly in cross-section of the operatively interrelated opaque disk, the first coacting pair and second coacting pair of light emitting diode and the phototransistor of the optical section of the electro-optical control system for transmitting signals to the electronic circuit for operating the motor to reposition the damper vanes in the damper assembly, as shown in FIG. 1B from the open to the closed position with the relative movement of the bores shown in dotted lines for the open position and solid lines for the closed position of the damper vanes for a uni-directional motor and illustrating, for a bi-directional motor, in phantomized lines, the alternate position of the second coacting pair of light emitting diode and phototransistor of the optical section for achieving this same operation on movement of the opaque disk as shown by the directional arrow, and FIG. 3 is a block diagram of the electronic circuit including the electronic switches of the electro-optical control system for actuating the motor in accordance with the signals transmitted from the coacting pairs of light emitting diodes and phototransistors of the electro-optical control system for the damper assembly shown in FIG. 1A, 1B, 2A and 2B.

DETAILED DESCRIPTION

Referring to the drawings, FIGS. 1A and 1B are schematic drawings showing one preferred application of the electro-optical control system in accordance with the present invention generally designated 10 for operating a motor 11 connected through a coupling assembly generally designated 12 for positioning the adjustably mounted vanes 13 of a damper assembly 14 to allow or inhibit the flow of air as indicated by the arrows in the associated air flow system, not shown.

Damper assemblies adapted for controlling the flow of air in heating, ventilating and air-conditioning systems are purchasable on the open market such as the Damper Assembly Model No. SMD sold by EWC Controls Incorporated of Englishtown, N.J. Accordingly, this device will not be more fully described or illustrated because it will be understood by those skilled in the art.

One form of motor 11 for this purpose is a uni-directional or bi-directional electrical motor with integral reduction gearing operating at 24 volts or system voltage. Those skilled in the art will recognize that other motors may be used, such as a servo type motor or a stepping motor which moves in incremental arcuate steps. However, the motor selected may only be significant from a cost containment factor as long as it is capable and operable for rotating the coupling assembly 12 in arcuate steps from its normally open position, as shown in the dotted lines, to a closed or nearly closed position as shown by the solid lines and vice versa as may be required to control the quantity of air flowing in the particular air flow system in which the damper assembly is mounted.

Motors of the type described are well known in the art and easily purchasable on the open market. Hence the structure and operation of the motor 11 will only be described to the extent that it is operatively associated with the electro-optical control system in accordance with the present invention.

Electro-optical control system 10 directing commands to the motor 11 for operating the vanes 13 of the damper assembly 14 includes, an opaque disk 15 which is fixedly connected to and movable with the coupling assembly 12 as the coupling assembly is rotated by the motor 11 to move the damper vanes 13 of the damper assembly 14 from the open position to the closed or approximately closed position and vice versa as the air flow system may require.

Opaque disk 15 is made of any suitable non-light transmitting plastic such as black phenolic, dark molded DEL-RIN™ and other well-known types of opaque plastic materials which are readily available on the open market. Opaque disk 15 has suitable fastening means as at 15a so it can be fixedly connected to the coupling assembly 12 to rotate therewith, as shown by the directional arrows in the figures of the drawings and thus will always reflect the relative position of the vanes 13 of the damper assembly 14. Opaque disk 15 is provided with at least two spaced openings or bores as at 16 and 17, respectively disposed on the disk at 180° from each other and extending end to end through the opaque disk 15 from the front face 15b to the back or rear face 15c of the opaque disk 15, generally parallel to the axis of rotation of the coupling assembly 12, all of which is shown in FIGS. 1A, 1B, 2A and 2B of the drawings. The opening or bore 16 is disposed on the opaque disk 15 at the point corresponding with the closed or approximately closed position of the damper vanes 13 and as the opaque disk rotates in accordance with the desired operation, as hereinafter more fully described, rotates to the point as shown by the dotted lines in these FIGURES of the drawings that corresponds with the normally and fully open position of the damper vanes 13 of the damper assembly 14. Spaced circumferentially at 180° from opening 16 is the opening or bore 17 which also rotates as the opaque disk 15 is rotated as shown by the solid and dotted lines in these FIGURES of the drawings and such movement of bore 17 corresponding to the repositioning of the damper vanes 13 from the open to the closed or approximately closed position.

Those skilled in the art will recognize that it may not be desirable to fully close the vanes 13 of the damper assembly 14, more particularly in heating, ventilating and air-conditioning air flow systems where excessive back pressure may affect the blower for delivering the air under pressure in the system. In order to achieve this result, the opening or bore 17 is so positioned that when the selected motor 11 stops rotating the vanes 13, they will not fully close or seal the air flow duct or vent of the associated air flow system, not shown, in which the damper assembly 14 is mounted.

The electro-optical control system can operate with AC or DC motors and use either AC or DC voltages to power the electro-optical control system. Further, the motor selected for adjustably positioning the vanes of the damper assembly can operate in a single direction or both clockwise and counterclockwise as it rotates to position and reposition the vanes from the open position or positions to the closed position to allow or inhibit air flow in the air system and vice versa. Thus, the motor, its direction of rotation and the use of AC or DC voltages may be selected, without departing from the scope of the present invention.

Since the opaque disk 15 is fixedly connected to the coupling assembly 12 and is movable therewith, the opaque disk 15 and the spaced bores 16 and 17 reflect the relative open and closed positions of the damper vanes 13 of the damper assembly 14. In order to detect and to sense the position of the vanes 13 as identified by the position of the opaque disk 15 and the spaced bores 16 and 17, the electro-optical control system 10 is provided with circumferentially fixed and spaced first light emitting diode (LED) 18a and second light emitting diode (LED) 19a mounted by any suitable means, not shown, adjacent to the front face 15b of the opaque disk 15. The LED's 18a and 19a will preferably have circumferential spacing at 90° from each other and the circumferential spacing for the openings or bores 16 and 17 in the opaque disk 15 will be at 180° from each other for reasons that will be clear from the operation of the present invention as hereinafter set forth, all of which is shown in FIGS. 1A, 1B, 2A and 2B of the drawings. A light emitting diode (LED) is an electronic component which emits a steady relatively narrow beam of light when current passes through it at the time the electronic system in which it is a component is in operation. LED's are electronic components which are well known in the electronic art.

Disposed to coact with the LED's 18a and 19a are a corresponding number of circumferentially spaced phototransistors 18b and 19b. The phototransistors 18b and 19b are fixedly mounted by any suitable means, also not shown, adjacent the back or rear face 15c of the opaque disk 15 in alignment with the respective associated LED's 18a and 19a. When either of the phototransistors 18b and 19b sense the beam of light issuing from their associated respective coacting LED's 18a or 19a through openings or bores 16 and 17, they convert the beam of light into an electrical signal which is transmitted and used as a signal by the associated elements of the electro-optical control 10, as is hereinafter described. Phototransistors are also well known in the electronic art and easily purchasable on the open market.

FIG. 3 shows that the electro-optical control 10 is provided with a power supply 20 which converts AC input voltage or DC input voltage to a level suitable to power the control logic circuitry 21 and provide the DC operating voltage for the respective LED's 18a and 19a and the phototransistors 18b and 19b. Control logic circuitry 21 may be either transistor logic or integrated circuit logic. It receives instructions for adjusting the damper assembly 14 in the associated air flow system from an input signal assembly 22 and operates by monitoring the electronic signals transmitted, if any, from the phototransistors 18b and 19b showing the position of the damper vanes 13. The electronic signals or no signals from the phototransistors 18b and 19b are used by the control logic circuitry 21 to position and reposition the damper vanes from open to closed or approximately closed and vice versa by generating a signal to an electronic switch assembly 23 for starting and stopping the motor rotating the vanes 13, to position the vanes 13 in accordance with the combined signal from the input signal assembly 22 and the signal, if any, from the phototransistors 18b and 19b to the control logic circuitry 21.

The lack of any electronic signals from the phototransistors 18b and 19b, that is, when the phototransistors are off, also serves to show the existing condition of the damper vanes 13. If no signal is received from either of the phototransistors 18b or 19b, the control logic circuitry 21 will signal the electronic switch assembly 23 in accordance with the signals from the input signal assembly 22 to start and stop the motor 11 to move the damper vanes either to an open position or a closed position and vice versa, after which actuation of the motor will terminate.

The operation of the electro-optical control 10 with the damper assembly 14 in accordance with the present invention, by way of illustration, may use a uni-directional or a bi-directional motor 11 which is actuated as a function of the interaction of the signals from the input signal assembly 22 and the signals, if any, transmitted from the phototransistors 18b and 19b. Thus, by reference to FIG. 1A showing movement of the damper vane from the closed to open position and FIG. 3 of the drawings, when voltage from the power supply 20 is applied to the open input terminal 22a of the input signal assembly 22 for moving the damper vanes 13 to the open position, the control logic circuitry switches LED 18a on and signals the electronic switch assembly 23 to activate motor 11. Motor 11 starts rotating clockwise and continues to rotate until the bore 16, coinciding with the open position of the damper vanes 13, as shown by the dotted lines for bore 16 in FIG. 1A, passes in front of the LED 18a, and light from this LED is detected and sensed by the phototransistor 18b. The phototransistor signals the condition of the damper vanes 13 to the control logic circuit 21. Control logic circuitry in turn transmits a control signal to and thus commands the electronic switch assembly 23 to terminate operation of the motor 11 and the motor stops. Bore 16 will be sized large enough to allow motor 11 to overshoot the open position of the damper vanes 13 in a range from 2° to 5° of rotational movement and still keep the phototransistor 18b sensing the light from the LED 18a and transmitting the necessary signals to the control logic circuitry to enable the electronic switch assembly 23 to terminate rotation of motor 11 and keep the damper vanes 13 in the open position.

By reference to FIGS. 1B and 3 of the drawings, when voltage from the power supply is applied to closed input terminal 22b of the input signal assembly for moving the damper vane 13 from the open position to the closed position, the control logic circuitry switches LED 19a on and sends a signal or commands the electronic switch assembly 23 to start motor 11 again. Motor 11 now starts rotating clockwise once again and continues to rotate. As bore 16 rotates from the open position, shown by the dotted line in FIG. 1B, to the former position of bore 17, shown by the solid lines and corresponding to the closed position of the damper vanes 13, the phototransistor 19b now senses the light being transmitted from LED 19a which is on and begins transmitting electronic signals to the control logic circuitry 21 that the damper vanes 13 have moved to the closed or approximately closed position. The control logic circuitry 21 now in turn commands the electronic switch assembly 23 to terminate the operation of the motor 11 and motor 11 stops. Opening or bore 16 is sized to permit the motor 11 to overshoot the closed position of the damper vanes 13 in a range from 2° to 5° of rotational movement so as to permit the phototransistor 19b to continue transmitting the necessary signals to the control logic circuitry to enable the electronic switch assembly 23 to terminate rotation of the motor 11 and keep the damper vanes in the closed position. When the movement of the damper vanes 13 from the open to the closed or approximately closed position is terminated, bore 17, which is substantially identical to bore 16, will now be in the position where bore 16 originated, and the system is again in position to reposition the damper vanes from open to close position or vice versa, all as above described for a uni-directional motor.

This operation can be repeated for repositioning the damper vanes 13 as voltage from the power supply 20 is applied to or removed respectively from the open or closed input terminals 22a and 22b and the respective associated LED 18a or LED 19A are turned on and off to obtain the desired operation to allow or to inhibit flow of air through the damper assembly in the associated air flow system.

The operation of the electro-optical control 10 for a damper assembly 14 having a two-input motor rotating in a single direction can also be illustrated by reference to FIG. 2B showing the phantomized circumferential repositioning of the second light emitting diode LED as at 19a' and second phototransistor as at 19b'. Thus, when voltage from the power supply 20 is applied to the open input terminal 22a of the input signal assembly 22, to move the damper vanes 13 of the damper assembly 14 to the open position, the control logic circuitry 21 switches LED 18a on and commands the electronic switch assembly 23 to actuate the motor 11. Motor 11 starts rotating and continues to rotate. When bore 16 rotates to the dotted line position on the opaque disk 15 corresponding to the open position of the damper vanes 13 and passes in front of LED 18a, phototransistor 18b detects and senses the light being emitted by LED 18a and signals the position of the damper vanes 13 to the control logic circuitry 21. Control logic circuitry 21 commands the electronic switch assembly 23 to terminate operation of the motor 11, and motor 11 stops rotating. Since bore 16 is oversized, as in the earlier illustration, the motor can overshoot the open position of the damper vanes 13 without prematurely terminating operation of the phototransistor 18b and the signals being transmitted to the control logic circuitry 21, thus insuring that the damper vanes 13 are moved to the fully open position.

When voltage from the power supply 20 is applied to the closed input terminal 22b of the input signal assembly 22, the control logic circuitry 21 switches LED 19a' on and commands the electronic switch assembly 23 to activate the motor 11 to move the damper vanes 13 from the open position to the closed position. Motor 11 starts rotating in the same direction and continues to rotate. When bore 17 rotates from the dotted line position corresponding to the open position of the damper vanes 13 to the solid line position formerly occupied by bore 16 and now corresponding to the closed or approximately closed position of the damper vanes 13, it passes in front of LED 19a'. The light emitted from LED 19a' is detected and sensed by phototransistor 19b', and phototransistor 19b' begins conducting and signaling the condition of the damper vanes 13 to the control logic circuitry 21. Control logic circuitry 21 sends a control signal or commands the electronic switch assembly 23 to terminate operation of the motor 11, and motor 11 stops. As in the earlier instances, the bore 17 will be oversized to permit the motor 11 to overshoot the closed or approximately closed position of the damper vanes 13 without terminating operation of phototransistor 19b, for the same object and purposes as above set forth.

As a still further illustration, operation of the electro-optical control 10 for the damper assembly 14 having a bi-directional motor; namely, a motor that rotates in one direction for opening the damper vanes and in the opposite direction for closing the damper vanes; will also be described with reference to FIG. 2B. Thus, when voltage from the power supply 20 is applied to the open input terminal 22a on the input signal assembly 22, to move the damper vanes 13 of the damper assembly 14 to the normally open position, the control logic circuitry 21 switches LED 18a on and commands the electronic switch assembly 23 to actuate the motor 11. Motor 11 starts rotating in the clockwise direction to cause the damper vanes 13 to move to the open position and continues to rotate. When bore 16 shown in dotted lines on the opaque disk 15 corresponding to the open position of the damper vanes 13 passes in front of LED 18a, phototransistor 18b detects and senses the light being emitted by LED 18a and signals the position of the damper vanes 13 to the control logic circuitry 21. Control logic circuitry 21 commands the electronic switch assembly to terminate operation of the motor 11, and motor 11 stops rotating. Since bore 16 is oversized, as in the earlier illustration, the motor can overshoot the open position of the damper vanes 13 without prematurely terminating operation of the phototransistor 18b and the signals transmitted to the control logic circuitry 21, thus insuring that the damper vanes 13 are moved to the fully open position.

Further, when the voltage from the power supply 20 is applied to the closed input terminal 22b of the input signal assembly 22, the control logic circuitry detects this, switches LED 19a on and commands the electronic switch assembly 23 to activate the motor 11 to rotate in the counter-clockwise direction to close the damper vanes 13. Accordingly, motor 11 starts to rotate in the closing direction for the damper vanes 13 and continues to rotate. When bore 17 shown in dotted lines on the opaque disk rotates to the position corresponding to the closed position of the damper vanes 13, it passes in front of LED 19a. The light transmitted from LED 19a through the opaque disk 15 is detected and sensed by phototransistors 19b and transmitted to the control logic circuitry 21. Control logic circuitry 21 commands the electronic switch assembly 23 to terminate operation of the motor 11, and motor 11 stops. The size of bore 17 allows the motor to overshoot the closed or approximately closed position of the damper vanes for the same purposes and objects as above set forth.

This operation for a damper assembly with a bi-directional motor can be repeated for positioning and repositioning the damper vanes 13 as voltage from the power supply 20 is applied to or removed from the open input terminal 22a or closed input terminal 22b of the input signal assembly 22 to obtain the desired operation to allow or to inhibit flow of air through the damper assembly in the associated air flow system.

Since the electro-optical system as above described utilizes electronic components, the problems of the earlier prior art mechanical-electrical switches are eliminated, the control system operates much more quietly, does not generate electromotive induction conditions which can interfere with microcontroller-based temperature and zone controls used in such air flow systems and can be easily modified to produce varying beneficial results as may be needed to customize a given air flow system.

While this invention has been described in terms of its preferred use, namely, controlling the flow of air in an air flow system, those skilled in the use of damper assemblies for this purpose will readily recognize that the present application is also applicable to fluid flow systems of all types where a device in such fluid flow systems can be operated by an electro-optical system in accordance with the present invention to allow or inhibit the flow of the fluid in any such fluid flow system.

It will be understood that the invention is not to be limited to the specific construction or arrangement of parts shown but that they may be widely modified within the invention defined by the following claims.

What is claimed is:

1. The combination with a damper assembly having, adjustably mounted damper vanes, a motor for positioning and repositioning the damper vanes between an open position and a closed position and vice versa for controlling the volume of air flowing in an associated air flow system of an electro-optical controller comprising:

a. opaque means at all times fixedly connected and movable with the damper vanes to reflect the position of the damper vanes;
   b. first means on the opaque means corresponding to the open position of the damper vanes and second means on the opaque means corresponding to the closed position of the damper vanes;
   c. a first pair of coacting electronic elements including, a first light transmitting member and a first light sensing and signaling member fixedly mounted and in alignment with each other, for operative action with the first means corresponding to the open position of the damper vanes;
   d. a second pair of coacting electronic elements including, a second light transmitting member and a second light sensing and signaling member fixedly mounted and in alignment with each other for operative action with the second means corresponding to the closed position of the damper vanes;
   e. an electronic circuit including, an input signaling assembly for directing the electronic circuit to move the damper vanes between the open and closed position and vice versa, and an electronic switch assembly for starting and stopping the motor in accordance with the signals of the electronic circuit; and
   f. said first sensing and signaling member connected to the electronic circuit to signal when the damper vanes are in the open position and said second sensing and signaling member connected to the electronic circuit to signal when the damper vanes are in the closed position to enable the electronic circuit to direct the electronic switch assembly to start and stop the motor in accordance with the signals received from the input signal assembly by the electronic circuit, for positioning and repositioning the damper vanes.

2. In the combination as in claim 1 wherein the opaque means is a rotatably mounted opaque disk, said first means corresponding to the open position of the damper vanes is a first bore extending end to end through said opaque means and the second means corresponding to the closed position of the damper vanes is a second bore extending end to end through said opaque means.

3. In the combination as in claim 2 wherein the opaque means has a front surface and a rear surface, said first pair of coacting electronic elements and said second pair of coacting electronic elements having their respective light transmitting members disposed in predetermined circumferentially spaced relation and fixedly mounted adjacent the front face of the opaque means to direct light towards the front surface of said opaque means, and their respective first and second light sensing and signaling members also disposed in circumferentially spaced relation and fixedly mounted adjacent the rear face of the opaque means and in alignment with the associated light transmitting member of the coacting pair so as to sense light from the associated light transmitting member when the first means corresponding to the open position and the second means corresponding to the closed position passes in front of at least one coacting light transmitting member of the respective first and second pair of coacting electronic elements.

4. In the combination as in claim 2 or 3 wherein the first means corresponding to the open position and the second means corresponding to the closed position are sized as a function of the motor for positioning and repositioning the damper vanes to permit the motor to overshoot when stopping the movement of the damper vanes.

5. The combination with a damper assembly having adjustably mounted damper vanes, a motor for positioning and repositioning the damper vanes between an open position and a closed position and vice versa for controlling the volume of air flowing in an associated air flow system of an electro-optical controller comprising:

a. opaque disk means at all times fixedly connected and movable with the damper vanes to reflect the position of the damper vanes, said opaque disk means having a front surface and a rear surface;

b. a first bore extending end-to-end through said opaque disk means corresponding to the open position of the damper vanes and a second bore also extending end-to-end through said opaque disk means corresponding to the closed position of the damper vanes and disposed at a predetermined spaced circumferential position from said first bore;

c. a first pair of coacting electronic elements including, a first light-transmitting member fixedly mounted adjacent the front face of the opaque disk means and a first light-sensing and signaling member fixedly mounted adjacent the rear face of the opaque disk means and in alignment with the first light-transmitting member to enable the first coacting electronic elements to be disposed for operative action with the first bore corresponding to the open position of the damper vanes;

d. a second pair of coacting electronic elements including, a second light-transmitting member fixedly mounted adjacent the front face of the opaque disk means and a second light-sensing and signaling member fixedly mounted adjacent the rear face of the opaque disk means and in alignment with the second light-transmitting member to enable the second coacting electronic elements to be disposed for operative action with the second bore corresponding to the closed position of the damper vanes;

e. said first pair of coacting electronic elements and said second pair of electronic elements having their respective first light-transmitting member and second light-transmitting member in predetermined circumferential spaced relation to enable their associated first light-sensing and signaling members and second light-sensing and signaling members to sense light from the associated light-transmitting member when the first bore corresponding to the open position of the damper vanes and the second bore corresponding to the closed position passes in front of light transmitted from the first light-transmitting means and the second light-transmitting means of the first and second pair of coacting electronic elements;

f. an electronic circuit including, an input signaling assembly for the electronic directing the electronic circuit to move the damper vanes between the open and closed position and vice versa, and an electronic switch assembly for starting and stopping the motor in accordance with the signals of the electronic circuit;

g. said first sensing and signaling member connected to the electronic circuit to signal when the damper vanes are in the open position and said second sensing and signaling member connected to the electronic circuit to signal when the damper vanes are in the closed position to enable the electronic circuit to direct the electronic switch assembly to start and stop the motor in accordance with the signals received from the input signal assembly of the electronic circuit, for positioning and repositioning the damper vanes; and h. the first bore corresponding to the open position and the second bore corresponding to the closed position are sized as a function of the motor for positioning and repositioning the damper vanes to provide 2° to 5° of additional rotation of the motor to permit the motor to overshoot when stopping the repositioning of the damper vanes.

6. In the combination as in claim 2 or 3 wherein the second means is so spaced as to permit limited flow when the damper vanes are moved to the closed position.

* * * * *